April 12, 1932. P. SUBKOW 1,854,002
PROCESS AND APPARATUS FOR RECTIFYING VAPORS
Filed Sept. 6, 1927 2 Sheets-Sheet 2
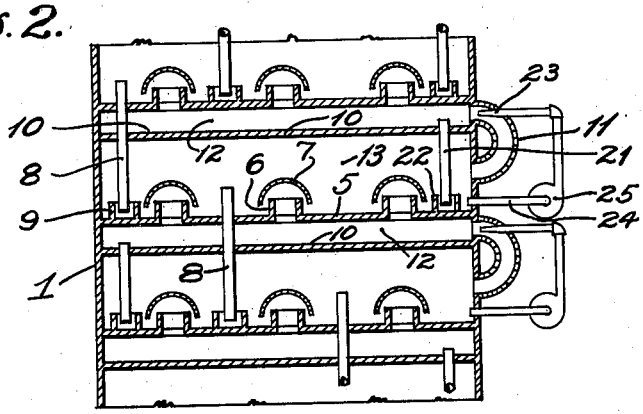
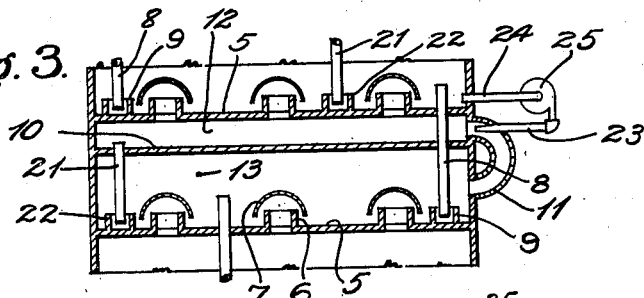
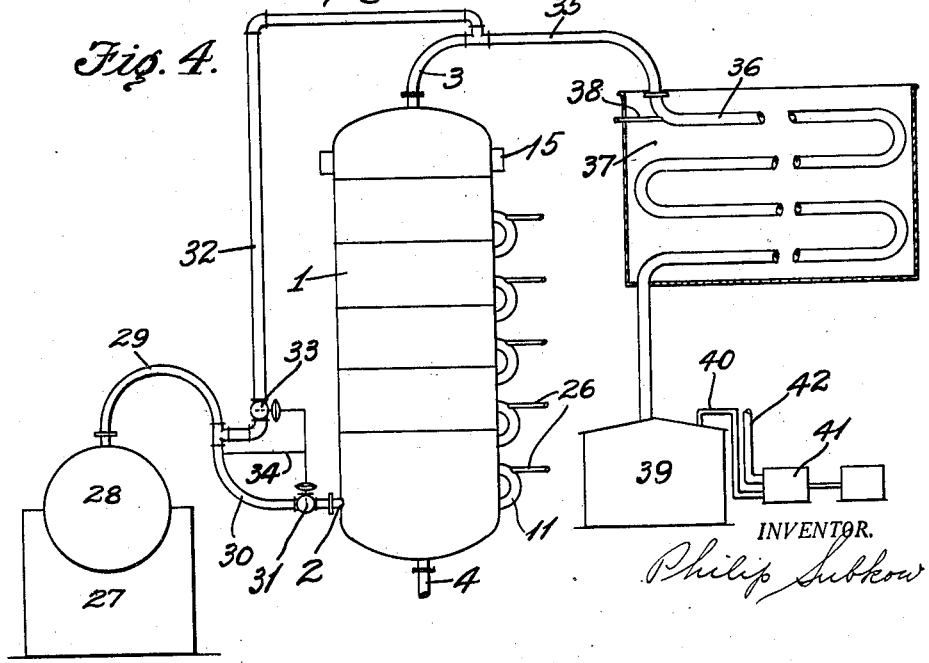
INVENTOR.
Philip Subkow Patented Apr. 12, 1932

1,854,002

UNITED STATES PATENT OFFICE

PHILIP SUBKOW, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

PROCESS AND APPARATUS FOR RECTIFYING VAPORS

Application filed September 6, 1927. Serial No. 217,790.

It is well known that in an apparatus for the contacting of a vapor with a liquid whereby the vapor is forced to travel through a liquid-vapor contact means such as the so-called "filled" column, or caused to pass through pools of condensate such as in the "bubble type" column, the back pressure, due to the resistance to the passage of vapor or gas through the baffling means and against the head of liquid in the column as, for instance, through pools of scrubbing liquid or condensate in said column, forms a definite limitation on the initial pressure of the vapors or gas, since they must have enough pressure to force them against this resistance. When such a column is used in the process of treating vapors by contact with a condensate formed from said vapors, it functions as a rectification column to rectify the vapors to produce a segregation and purification of the components thereof.

In distillation, the higher the pressure, the greater the distillation temperature and the more heat is required for distillation. In some cases, such as in the distillation of decomposable bodies such as mineral lubricating oils the distillation temperature must not exceed the temperature at which decomposition sets in. Consequently very high vacuums ranging from 1 m. m. pressure are employed. In vacuum distillation, the rectification column or other condensing means is usually placed between the vaporizing means and the vacuum generating means. The back pressure of the column will determine the amount of vacuum which may be maintained over the vaporizing surface. This back pressure depends on the size of the rectifying column and the depth of liquid maintained on the plates, the volume and velocity of the vapors passed through, etc. Even if a substantially perfect vacuum is maintained by the vacuum pump, the actual distillation pressure can never be less than this back pressure, which may in effect entirely overcome the vacuum generated by the vacuum pump and make impossible vaporization in vacuum. Consequently, distillation under any considerable vacuum never employs a rectification tower, and depends entirely on crude fractional condensation for the purification and segregation of the components of the vapor. This is especially true where the vacuum is of the order of 200 m. m. pressure. A single plate may cause a back pressure of 20 to 25 m. m., and a column usually exceeds ten plates. A column is impossible in modern systems employing 25 m. m. or less pressure.

It is the purpose of this invention to provide a process and apparatus which would allow the efficient contact of vapors or gases and liquids, such as, for instance, employed in rectification without any considerable back pressure. It is then particularly adapted for the production of lubricating oils under very high vacuum or other vacuum distillations, where the back pressure of the rectifying column makes its use impossible.

This invention pertains to a process and apparatus for the treatment of vapors or gases under such conditions that the pressure of the vapors entering the process or apparatus is not considerably more than the outgoing vapors or gases. It is more particularly directed to a process of treating vapors under substantially uniform pressure and more particularly directed to a process of rectifying vapors by counter-current contact with a condensate formed from said vapors. More particularly it is directed to a process of rectifying vapors under high vacuum, wherein the normal back pressure of the rectification column necessitates a vaporization pressure greater than the desired pressure.

This invention pertains to a column with substantially no back pressure, that is, the pressure at the top and the bottom of the column is substantially the same, and one in which a practically uniform pressure is maintained throughout the column. Thus, when employed in vacuum, distillation vaporization may occur at substantially the same vacuum as is caused by the vacuum generating means.

This invention, in one of its aspects, comprises means for forcing the vapor against the back pressure of a column by means of an extraneous force, that is, by providing an extraneous pressure other than the natural pressure of the vapor resulting from their generation. In another of the broad aspects, it comprises means for forcing the vapors through pools of condensate or other liquid by the imposition of an extraneous pressure on the vapor to force the vapor from one pool through another, overcoming in successive stages the individual back pressure of the various pools. In the embodiment herein disclosed the apparatus comprises a plurality of mechanical vapor pumps. In the embodiment herein disclosed the vapor pumps are of the jet type wherein a moving body of fluid acts to aspirate a second body of fluid.

The invention will be better understood by referring to the accompanying drawings.

Fig. 2 is a vertical section of a fragment of the tower showing another embodiment of the invention.

Fig. 3 is a vertical section of a fragment of the tower showing another embodiment of the invention.

Fig. 4 shows an assembly embodiment of this invention.

Figure 1:
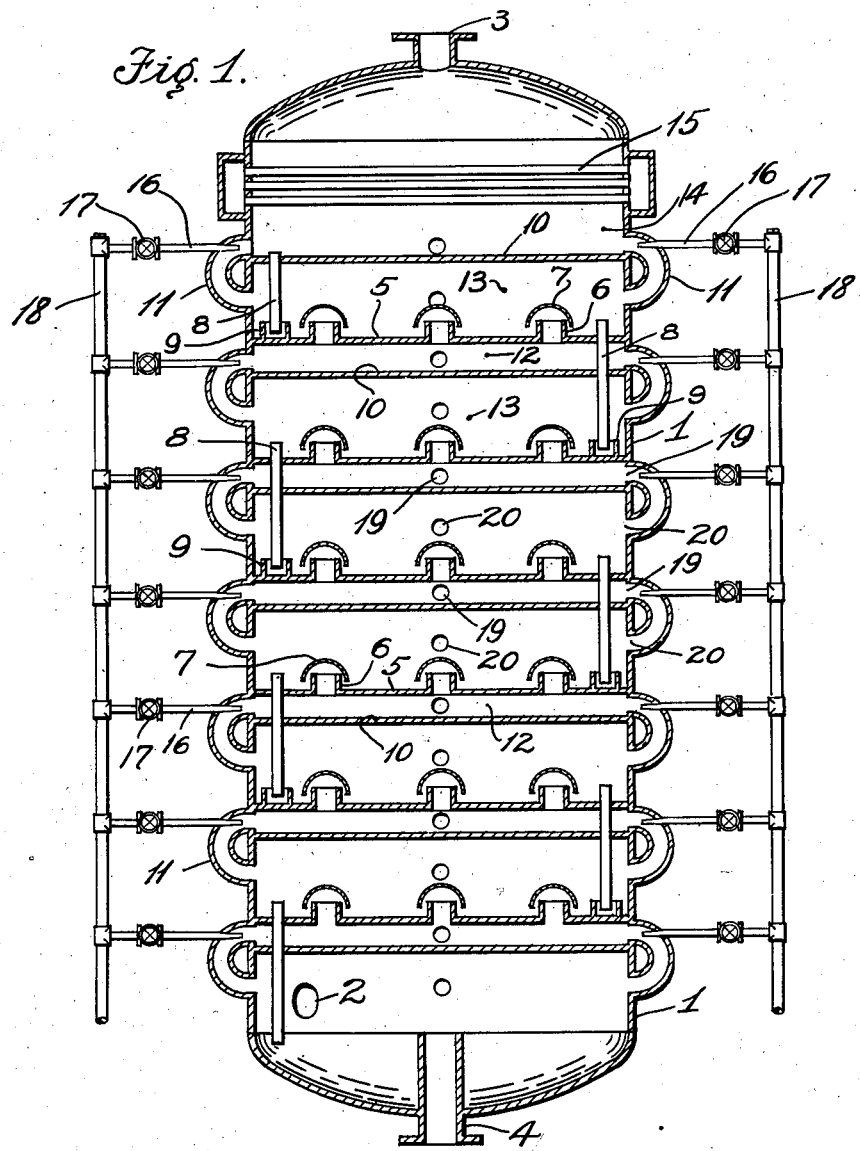
Fig. 1 is a vertical section of a tower embodying one form of the invention.

Fig. 1 is a schematic showing of the invention in which (1) is the body of the tower, (2) is a vapor inlet, (3) is a vapor outlet, (4) is a condensate outlet, (5) are bubble trays of the well-known type in which (6) are vapor risers and (7) bell cups of the usual construction. The number of bubble cups, size and dimensions are all a matter of design as will be understood by those skilled in the art. (8) are liquid downcomers sealed in sealing cups (9). (10) is an imperforate plate placed beneath each tray. (11) is a vapor conduit connecting space (12) between the bubble plate and the imperforate plate (10) and the space (13) above the bubble plate. An imperforate plate (10) is positioned between the top tray and the dephlegmating cooling coil (15). A vapor connection (11) connects the space (13) of the top bubble section and the dephlegmating space (14). Into each connection (11) is introduced a jet pipe (16) controlled by valve (17). (18) is a manifold for the motivating fluid, in this case, steam. Other fluids may be employed as seen below. There may be a number of connections (11) placed circumferentially of the tower at the various levels. Four are shown in this case placed 90° apart. Points of ingress (19) and egress (20) are shown in the plan of the paper.

Fig. 2 shows a modification in which the liquid condensate collected on the trays is used as a jetting means for moving the vapor rising from the same bubble tray. As previously shown, the trays (5) are of the conventional "bubble type" with vapor risers (6). (7) are bell caps. The liquid downcomers (8) are sealed in cups (9). An imperforate plate (10) is placed beneath each bubble plate (5) providing a space therebetween, herein numbered (12). An additional downcomer (21) is provided for passing liquid from space (12) to next lower tray (5). This downcomer is sealed in cup (22). A vapor conduit (11) connects space (13) above the bubble tray with space (12). A line (24) and a pump (25) is used to pump liquid from plate (5) through jet (23) located in connection (11) at the point of connection to space (12). As previously mentioned, there may be a number of connections such as (11) and number of pumps and jets placed circumferentially of the tower or one pump may be used to pump liquid from a plate through all jets in the vapor connections at any one level. A separate pump means is preferably provided for each plate.

In Fig. 3 the liquid from the next upper plate is used to pump the upcoming vapor. As previously, the tower is comprised of a number of bubble plates (5), with vapor risers (6), and bell caps (7), liquid downcomers (8) sealed in cups (9). Below each plate is an imperforate plate (10) providing space (12) between plate (10) and bubble tray (5). A liquid downcomer (21) sealed in cup (22) is provided for the passage of liquid from space (12) to the next lower plate (5). A vapor connection (11) connects space (13) above the bubble tray with space (12). A line (24) and pump (25) is used for pumping the liquid from the tray (5) through jet (23) into vapor connection (11) to the space (12) immediately below said plate (5).

Fig. 4 shows an exemplary view utilizing the tower of this invention. (28) is a still, conventionally shown in a schematic furnace (27). (29) is a vapor line connecting still (28) with tower (1). This tower may be of any of the types previously shown, having a dephlegmating coil (15), condensate outlet (4), vapor outlet (3), condensing coil (36) situated in box (37), vapor conduits (11) of the type shown in previous Figs. 1–3 for leading the vapor from above one plate through the next plate. (26) are jets in said conduits and these may be of either of the types shown in Figs. 1–3 utilizing steam, gas or liquid. (38) is a jet at the point of inlet of the vapor tube condensing coil (36). Any motivating fluid such as steam or gas may be employed, or condensate collected in condensing tank (39) may be employed. (41) is a vacuum pump drawing vapors from (40) and forcing them through (42). (31) is a pressure controlled valve in line (30). (32) is a by-pass line connecting (3) with vapor line (29). (33) is a pressure controlled valve in line (32). The valves (31) and (33) are so constructed that, when pressure in line (30) mounts beyond a certain point, valve (31) closes and (33) opens.

The operation of the above devices will be understood from the following:

*Fig. 1.*—Vapor enters into the tower at any selected point, as, for instance, into the bottom in Fig. 1. Vapor passes through the connections (11) into the space (12) under the suction of a jet of fluid such as steam introduced via (18) through nozzle (16). The amount of suction is controlled by valve (17). Fixed gas or liquid may be used in place of steam as will be understood. The amount of jetting medium introduced and its pressure should be such as to force the vapors against the resistance of liquid collected on plate (5) and enough to overcome the friction of the plate construction. Liquid from the plate is returned to the next lower plate as is conventional. The vapor rising from the top section is forced in like manner through the space (14) and past the coils (15) to provide reflux, finally exiting through (3). It will be observed that by means of this operation the vapor is extraneously forced against the back pressure of the column so that the pressure of the space (13) and space (12) are substantially the same. The vapor rising from each bubble plate is compressed to overcome the hydrostatic head of accumulated liquid on the plate and the frictional resistance of plate construction. Since this compression occurs in a plurality of stages, each compression will be minimized. In the preferred embodiment, the action of the jets will be just sufficient to overcome the back pressure of the next succeeding stage. The vapors issue through the vapor risers and expand immediately so that the compression is substantially instantaneous. It will be seen thus that the tower operates at a substantially uniform pressure. The pressure of the vapor at inlet and outlet of the tower and each section will be substantially the same.

In Fig. 1, employing steam or fixed gas, there is a constant addition of vapor to the upgoing steam with a tendency to load the towers. Counteracting this is the constant diminution in volume due to condensation. In using steam or fixed gas there is the disadvantage of successive distillations on the various plates, by means of extraneously injected vapor or gas. In Figs. 2 and 3, this addition of vapor and distillation is avoided. In Fig. 3, the liquid is passed counter-current to the vapor. Thus, in Fig. 3, liquid from one plate is pumped into the vapor connection of the lower plate to aspirate the vapor rising from the plate next below. The liquid separated from the vapor in space (12) passes to the next lower plate and the vapor to the next upper plate to establish counter-current passage.

Fig. 2 is an embodiment in which liquid from one plate is circulated as an aspirating medium to the vapor conduits associated with the same plate and liquid is returned to its original source. Thus, in Fig. 2, liquid is pumped through (24) by means of pump (25) and through jet (23) forcing the vapor together with the liquid into space (12). The liquid in space (12) is separated from the vapor, the liquid returning via downcomer (21) and the vapor rising to the next upper plate.

It will be seen in Fig. 2 that, since liquid is circulated, it has no effect upon the rectifying conditions in the tower. In Fig. 3 the liquid is passed downward both through the pump (25) and downcomers (8). The pump (25) must be regulated so that the correct amount of liquid is being sent downward. In the operation shown in Fig. 2, the amount of liquid passed to the lower plates is unaffected by the speed of the pump and the aspirating effect can be controlled independently of the amount of reflux. The operation of the tower in Figs. 2 and 3 is in other respects the same as in Fig. 1.

In Fig. 4 the use of these towers for distilling, rectifying and condensing under substantially the same pressure is shown. It will be seen then that an additional jet is provided at the head of condenser (36) so that vapors may be compressed to overcome the resistance of condenser. More than one such vapor pump or jet may be employed if desired to pump the vapor through condenser. In this manner the high vacuum generated by pump (41) is made available at the still (28) and the frictional resistance and back pressure of the rectifying column is nullified.

In operating this tower under vacuum, where it is desired to maintain the pressure substantially constant, means must be provided for eliminating back pressure of the column should anything happen to the pumps. In such case, the pressure in the column would rise immediately. Means may be provided for by-passing the tower by means of a pressure actuated valve which would by-pass the vapors from still to condenser or to second tower. Such pressure actuated valves are old in the art and will be understood by those skilled in the art. Such a connection is shown in Fig. 4, wherein, under sudden rise of pressure in the still (28), valve (31) will close and valve (33) will open, by-passing the vapor through connection (32).

It will be seen that the tower above disclosed is essentially a bubble plate of novel design. Vapors coming from the next lower plate bubble through the condensate on the said plate and condensate from the next upper plate is introduced on the plate in question. It will be observed that the suction caused by the pump will cause a drag on the vapors and force the vapors through the liquid on the various plates to overcome the back pressure of the construction, and to cause an intimate contact of liquid and vapors, which are divided into a plurality of streams to ensure optimum contact. It will be observed that, by independently operating the several pumps, any desired pressure variation of the tower may be obtained. Instead of keeping pressure substantially constant the pressure in the tower may be increased or decreased in any desired fashion, as will be understood by those skilled in the art.

Other types of pumps, such as mechanically operated pumps or blowers, may be used instead of the fluid jets. The pumps or blowers may be placed inside as well as outside the tower. While bubble plates are shown, the same is applicable to other types of towers such as "filled types." The bubble trays may be replaced by perforated plates with or without filling material such as Raschig rings, etc.

The above is merely illustrative and not as limiting my invention.

I claim:

1. A method of treating vapors which comprises rectifying said vapors by passing them through a plurality of pools of condensate formed from said vapors and extraneously forcing said vapors through said pools.

2. A method of treating vapors which comprises rectifying said vapors by passing them through a plurality of pools of condensate formed from said vapors and compressing said vapors to an amount sufficient to overcome the back pressure of said pools.

3. A method of treating vapors which comprises rectifying said vapors by passing the vapors in counter-current passage with condensate formed from said vapors and extraneously forcing the vapors counter-current to said condensate.

4. A method of treating vapors which comprises rectifying said vapors by passing the vapors in counter-current passage with condensate formed from said vapors and compressing said vapors to an amount sufficient to overcome the back pressure of said passage.

5. A method of rectification which comprises passing vapors through a rectification unit and overcoming the frictional and hydraulic resistance of said unit by a force other than the expansive force of the vapors entering said unit.

6. A method of rectification which comprises passing vapors through a rectification unit and extraneously forcing said vapors through said rectification unit in a plurality of stages.

7. A method of rectification which comprses passing vapors through a rectification unit and compressing said vapors in a plurality of stages in their passage through said rectification unit.

8. A method of rectification which comprises passing vapors through a plurality of stages in contact with condensate formed from said vapors, withdrawing vapors from one stage and extraneously forcing them through a subsequent stage.

9. A method of rectification which comprises passing vapors through a plurality of stages in contact with condensate formed from said vapors, withdrawing vapors from one stage and compressing them in an amount sufficient to overcome the back pressure of a subsequent stage and introducing the compressed vapors into said subsequent stage.

10. A method of rectification which comprises passing vapors through a plurality of stages in contact with condensate formed from said vapors, withdrawing vapors from each stage and extraneously forcing them through the next succeeding stage.

11. A method of rectification which comprises passing vapors through a plurality of stages in contact with condensate formed from said vapors, withdrawing vapors from each stage and compressing the vapors to an amount sufficient to overcome the back pressure of the next succeeding stage and introducing the compressed vapors into the next succeeding stage.

12. A method of rectification which comprises passing vapors through a plurality of pools of condensate formed from said vapors, withdrawing vapors from one pool and forcing them through a subsequent pool.

13. A method of rectification which comprises passing vapors through a plurality of pools of condensate formed from said vapors, withdrawing vapors from one pool and compressing the vapors to an amount sufficient to overcome the back pressure of a subsequent pool and introducing the compressed vapors into a subsequent pool.

14. A method of rectification which comprises passing vapors through a plurality of pools of condensate formed from said vapors, withdrawing vapors from each pool and forcing them through the next succeeding pool.

15. A method of rectification which comprises passing vapors through a plurality of pools of condensate formed from said vapors, withdrawing vapors from each pool and compressing the vapors to an amount sufficient to overcome the back pressure of the subsequent pool and introducing the compressed vapors into the subsequent pool.

16. A process of distillation which comprises vaporizing a liquid, rectifying the vapors to form a condensate and uncondensed vapor, condensing said uncondensed vapor and maintaining the pressure during the process substantially the same in all the said steps.

17. A process of distillation which comprises vaporizing a liquid, rectifying the vapors to form a condensate, and uncondensed vapor condensing said uncondensed vapor and maintaining the pressure during vaporization and rectification substantially the same.

18. A process of distillation which comprises vaporizing a liquid in a vaporizing means and condensing the vapor produced from said liquid in a condensing means at a pressure substantially equal to that maintained during vaporization, and by-passing the vapor to a second condensing means when the vaporization pressure in said vaporizing means exceeds a predetermined limit.

19. A process of distillation comprising vaporizing a liquid in a vaporizing means, rectifying the thus produced vapors in a rectifying means and finally condensing the vapors under substantially a uniform pressure and by-passing the vapors around the rectifying means when the pressure in the vaporizing means exceeds a predetermined limit.

20. An apparatus for treating vapors which comprises a plurality of sections, means for pumping vapors through said sections and means for intimately contacting vapors and liquids in said sections.

21. In combination, a still, a rectification column comprising means for establishing a flow of liquid therethrough and means for introducing vapor into said column, means for pumping vapors through said column, a final condenser, and means for exhausting vapor from said condenser.

22. In combination, a still, a rectification column, and means for introducing vapors to said column and means for compressing the vapors in said column at a plurality of stages.

23. In a column, means for overcoming the back pressure of said column to maintain pressure at the entrance and exit of said column substantially the same.

24. A rectification column, means for establishing contact between liquid and vapors in said column and means for overcoming the back pressure of said contact.

25. A rectification column comprising a plurality of sections, means for pumping the vapors from one section through the liquid in the succeeding section and means for passing liquid from one section to the subsequent section.

26. A rectification column comprising a plurality of liquid vapor contact sections, a plurality of vapor pumps between said sections and means for operatively connecting certain of said pumps to certain of said sections.

27. A column, comprising a plurality of sections, a plurality of jet pumps between said sections and means for operatively connecting certain of said pumps to certain of said sections.

28. A rectification column comprising a purality of liquid vapor sections, a plurality of vapor pumps between said sections, means for leading vapor from one section to said pumps, means for introducing the compressed vapors into the succeeding section and means for passing liquid and vapors counter-currently through said sections.

29. A column, comprising a plurality of liquid vapor sections, a plurality of jet pumps between said sections, means for leading vapor from one section to said pumps, means for introducing the compressed vapors into the succeeding section and means for passing liquid vapors counter-currently through said sections.

30. A column, comprising a plurality of liquid and vapor contact sections, a perforate plate at the bottom of said sections, an imperforate plate below said perforate plate and forming the top of the next succeeding plate, a vapor conduit from one section connected to the space intermediate the perforate and imperforate plate, means for passing liquid from one section to a succeeding section in counter-current flow to the vapor flowing therethrough and a pump for forcing the vapors through said conduit into said space.

31. A column, comprising a plurality of liquid and vapor contact sections, a perforate plate at the bottom of said sections, an imperforate plate below said perforate plate and forming the top of the next succeeding section, a vapor conduit from one section connected to the space intermediate the perforate and imperforate plate, means for passing liquid from one section to a succeeding section in counter-current flow to the vapor and a jet pump for forcing the vapors through said conduit into said space.

32. A column, comprising a plurality of liquid and vapor contact sections, and means for pumping vapor from one section to a subsequent section by means of liquid in said column.

33. A column comprising a plurality of liquid and vapor contact sections, means for withdrawing liquid from said sections and means for pumping the vapor from one section to a subsequent section by means of the withdrawn liquid.

34. A column comprising liquid and vapor contact sections, means for withdrawing liquid and vapors from the sections and means for pumping the vapor from one section to a subsequent section by means of the liquid withdrawn from said first mentioned section.

35. A column comprising liquid and vapor contact sections, means for withdrawing liquid and vapors from the sections and means for pumping the vapor from one section to a subsequent section by means of the liquid withdrawn from said first mentioned section and means for returning the liquid to the first mentioned section.

36. A rectification column comprising liquid and vapor contact sections, vapor conduits between sections, closed liquid conduits between sections adapted to constrain the liquid under pressure, pumps in said conduits, said liquid conduits connecting the pumps with said vapor conduits for discharge of the liquid under pump pressure into said vapor conduits to pump said vapors through said vapor conduits.

37. A liquid vapor contact column comprising a plurality of contacting sections, a pump, a liquid conduit from said column to said pump and a liquid discharge conduit from said pump to said column, a vapor conduit leading from one section to another, said liquid discharge conduit being connected with the vapor conduit, and the pump being adapted to maintain a discharge pressure of the liquid from the liquid discharge conduit sufficiently high to obtain a substantial entraining effect on the vapors at the point where the liquid discharge conduit discharges into the vapor conduit.

38. An apparatus for distillation which comprises a vaporizing unit, a condensation unit, a second condensation unit, means for maintaining the pressure of the vapors during distillation and condensation substantially the same and means for by-passing vapors from the vaporization unit to the second condensing unit when the distillation pressure exceeds a predetermined limit.

39. An apparatus for distillation which comprises a vaporizer, a rectification unit and a condensing means, means for maintaining pressure during vaporization and rectification substantially constant and means for by-passing vapors around said rectification unit when the distillation pressure exceeds a predetermined limit.

40. An apparatus for distillation comprising a vaporizer, a rectification unit and a condensing means, for maintaining pressure in the vaporizer, rectifier and condenser substantially the same and means for by-passing the vapors around said rectifier when the pressure in the vaporizer exceeds a predetermined limit.

41. A method of condensation which comprises passing vapors through a condensing means and overcoming the frictional resistance of the condensing means to maintain the pressure at the beginning and end of the condensation substantially the same.

42. A method of condensing vapors which comprises passsing vapors through a condensing means and overcoming the frictional resistance of the condensing means to maintain the pressure on the vapors during condensation substantially constant.

43. Method of treating vapors which comprises passing vapors in intimate contact with a liquid in a vapor and liquid contact means and overcoming the frictional resistance of said means to maintain the contact of vapors and liquid at a substantially uniform pressure throughout said contact.

44. Method of treating vapors which comprises contacting liquids and vapors in a vapor and liquid contact means and overcoming the frictional resistance of said contact means to maintain the pressure on the vapors at the beginning and end of said contact in said contact means at substantially the same pressure.

45. Method of treating vapors which comprises generating mixed vapors and rectifying said vapors in a rectifying means and overcoming the frictional resistance of said rectifying means to maintain the pressure during rectification in said rectifying means at substantially the same pressure as the pressure during generation of said vapors.

46. An apparatus for distillation which comprises a vaporizing unit, a condensation unit, a second condensation unit, means to pass the vapors from the vaporizing unit through said condensation units, and means for overcoming the frictional resistance of said condensation units to maintain the pressure of the vapors during distillation and condensation substantially the same.

47. An apparatus for distillation which comprises a vaporizer, a rectification unit and a condensing means, means for passing the vapor from the vaporizer through the rectification unit and through the condensing means, means for overcoming the frictional resistance of said system to maintain the pressure during vaporization and rectification substantially the same.

48. An apparatus for distillation which comprises a vaporizer, a rectification unit and a condensing means, means for passing the vapor from the vaporizer through the rectification unit and condensing means, means for overcoming the frictional resistance of said rectification unit and said condensing unit to maintain the pressure in the vaporizer, rectification unit and condenser substantially the same.

Signed at Los Angeles, in the county of Los Angeles, and State of California, this 31st day of August A. D. 1927.

PHILIP SUBKOW.